United States Patent [19]

Björn-Ake

[11] Patent Number: 4,828,058

[45] Date of Patent: May 9, 1989

[54] HOVERCRAFT WITH IMPROVED MANEUVERABILITY

[76] Inventor: Olof Björn-Ake, 16, Vikingavägen, S-605 90 Norrköping, Sweden

[21] Appl. No.: 23,266

[22] Filed: Mar. 9, 1987

Related U.S. Application Data

[63] Continuation-in-part of Ser. No. 833,385, May 14, 1985.

[30] Foreign Application Priority Data

May 17, 1984 [SE] Sweden .................................. 8402670

[51] Int. Cl.⁴ ............................ B60V 1/18; B60V 3/02
[52] U.S. Cl. .................................... 180/116; 114/67 A; 180/117; 180/120; 180/121; 180/128; 244/23 A; 244/23 R; 244/100 A; 244/12.4
[58] Field of Search ............... 180/116, 117, 120, 121, 180/127, 128; 114/67 A; 244/23 A, 23 R, 100 A, 52, 12.1, 12.4

[56] References Cited

U.S. PATENT DOCUMENTS

| | | | |
|---|---|---|---|
| 3,065,929 | 11/1962 | Holland, Jr. ........................ | 244/12.4 |
| 3,183,988 | 5/1965 | Jones .................................... | 180/117 |
| 3,335,977 | 8/1967 | Meditz ................................ | 244/12.4 |
| 3,827,527 | 8/1974 | Bertelsen ............................. | 180/120 |
| 3,912,038 | 10/1975 | Bernaerts ........................ | 180/116 X |
| 4,171,784 | 10/1979 | Eickmann ....................... | 244/12.4 X |

FOREIGN PATENT DOCUMENTS

| | | | |
|---|---|---|---|
| 2526384 | 11/1983 | France ................................ | 180/116 |
| 370266 | 4/1939 | Italy ................................. | 244/100 A |
| 701401 | 2/1966 | Italy ................................. | 244/12.4 |
| 1141575 | 1/1969 | United Kingdom ............. | 244/12 A |
| 1184062 | 3/1970 | United Kingdom ................ | 180/116 |

Primary Examiner—Charles A. Marmor
Assistant Examiner—Mitchell J. Hill
Attorney, Agent, or Firm—Sherman and Shalloway

[57] ABSTRACT

Disclosed is a hovercraft having a pair of air cushions, associated with each air cushion is a rotatable fan which partly produces lifting force and partly propels and maneuvers the craft. The fans are mounted perpendicular to the direction of travel, peripherally on the craft, wherewith the forces produced have long moment arms, and consequently produce a strong turning torque. The fans are mounted on the craft in such a manner that their orientation may be adjusted both horizontally and vertically with respect thereto.

3 Claims, 3 Drawing Sheets

HOVERCRAFT WITH IMPROVED MANEUVERABILITY

This application is a continuation-in-part of application Ser. No. 833,385 filed May 14, 1985.

BACKGROUND OF THE INVENTION

The present invention relates to a hovercraft with improved maneuverability. In the prior art, hovercraft are known, however, in prior designs, it is sometimes difficult to maintain easy access to the freight and passenger cabin sections due to the presence of large fans which are necessary for the propulsion and control of the hovercraft. Furthermore, hovercraft are well known for the large amounts of noise which enter the passenger cabin and for their inability to adjust to piers of differing heights where the hovercraft may be docked.

SUMMARY OF THE INVENTION

In order to maintain access to the freight and passenger cabin sections, including low threshold height, the air cushioning is divided into two structures which are attached to the cabin.

Each such structure has a rotatable fan which partly produces lifting force through the vertical component of air flow generated thereby and partly drives the craft forward through the horizontal component of the flow generated thereby. The fans are mounted perpendicularly to the direction of travel, and by varying the "deflection" the craft can be braked or the direction of travel can be changed.

The location of the air cushions allows relative freedom in placement of motor and fuel tanks in relation to the center of gravity of the craft.

The catamaran principle and the weight distribution give better stability than a conventional hovercraft. "Finger skirtings", which are less elaborate and less expensive, may be employed, with diminished stability.

The engine noise in the cabin can be kept at a very low level, since the engine compartments at the air cushions are sound-insulated, and the cabin itself is sound-insulated.

The cabin can be raised and lowered with respect to the air cushions if necessary, in order to adjust the piers at different heights above the water. However, in the most usual case, unloading and loading are carried out at the shore.

SPECIFIC DESCRIPTION OF THE PREFERRED EMBODIMENT

Figure 1:
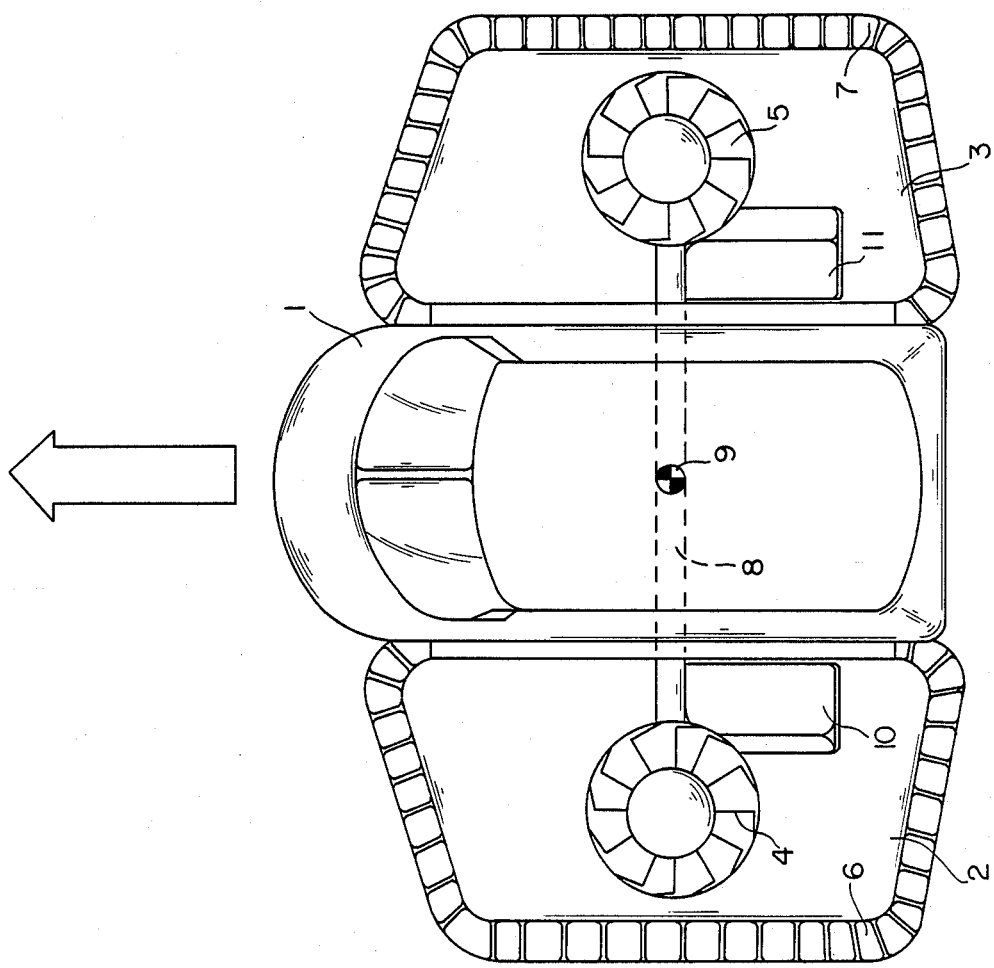
FIG. 1 shows a top plan view of the hovercraft.
Figure 2:
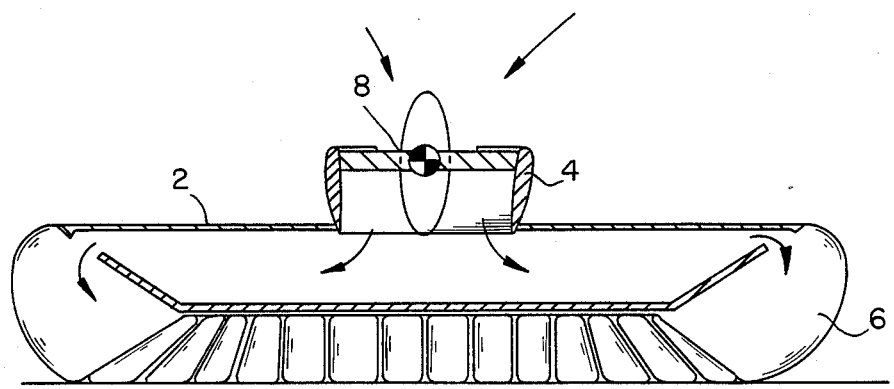
FIG. 2 shows a lengthwise section of one of the air cushioning sections showing the fan in only lifting state.

In FIG. 1 is shown a top plan view of the hovercraft according to the invention, incorporating a passenger cabin section 1 with one air cushioning section 2, 3 on each side of the passenger cabin section. On each air cushioning section is mounted a motor 10, 11 and a fan 4, 5 and also a skirting 6, 7. As the fans 4, 5 are mounted on the air cushioning sections 2, 3 relatively long moment arms 8 from the center of gravity 9 of the craft are obtained. As shown in FIG. 1, the fans 4, 5 are preferably so arranged on the air cushioning sections that the connection line between the centers of the fans passes through the center of gravity 9. Through this arrangement of the fans the craft has achieved an improved maneuverability and also a better stability. By the arrangement of two separate sections carrying the motors 10, 11 and the fans 4, 5 it has also been possible to obtain a much better sound and vibration insulation of the passenger cabin section 1.

Figure 3:
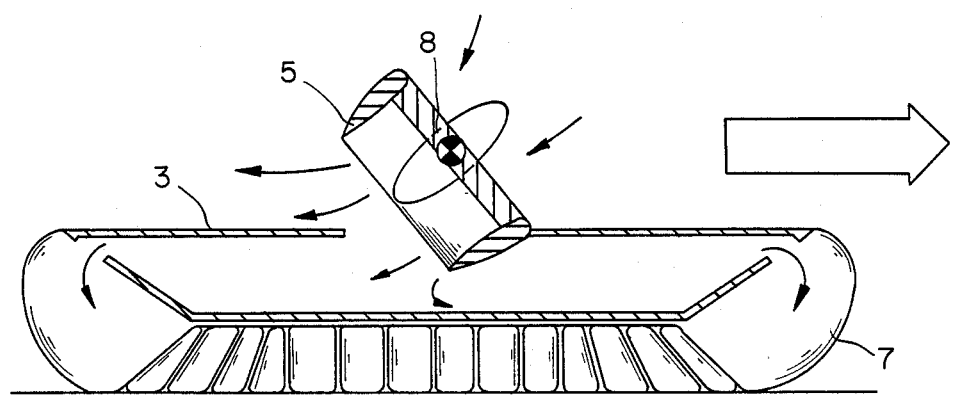
FIG. 3 shows the same section as FIG. 2 but the fan is in a state for both lifting and propulsion.

In the orientation of parts shown in FIG. 3, the fan 5 is shown at an angled orientation resulting in both lifting and propelling forces being generated. This occurs because the vertical component of the angled air flow causes vertical lift, while the horizontal component of the angled air flow causes horizontal propulsion.

In accordance with one aspect of the invention the passenger cabin section 1 can be raised and lowered in respect of the air cushioning sections 2, 3. The passenger cabin section 1 can be carried on the upper connections on hydraulic piston/cylinder arrangements, the lower connections of which are carried by the air cushioning sections 2, 3. Such piston/cylinder arrangements are shown in FIG. 4.

Figure 4:
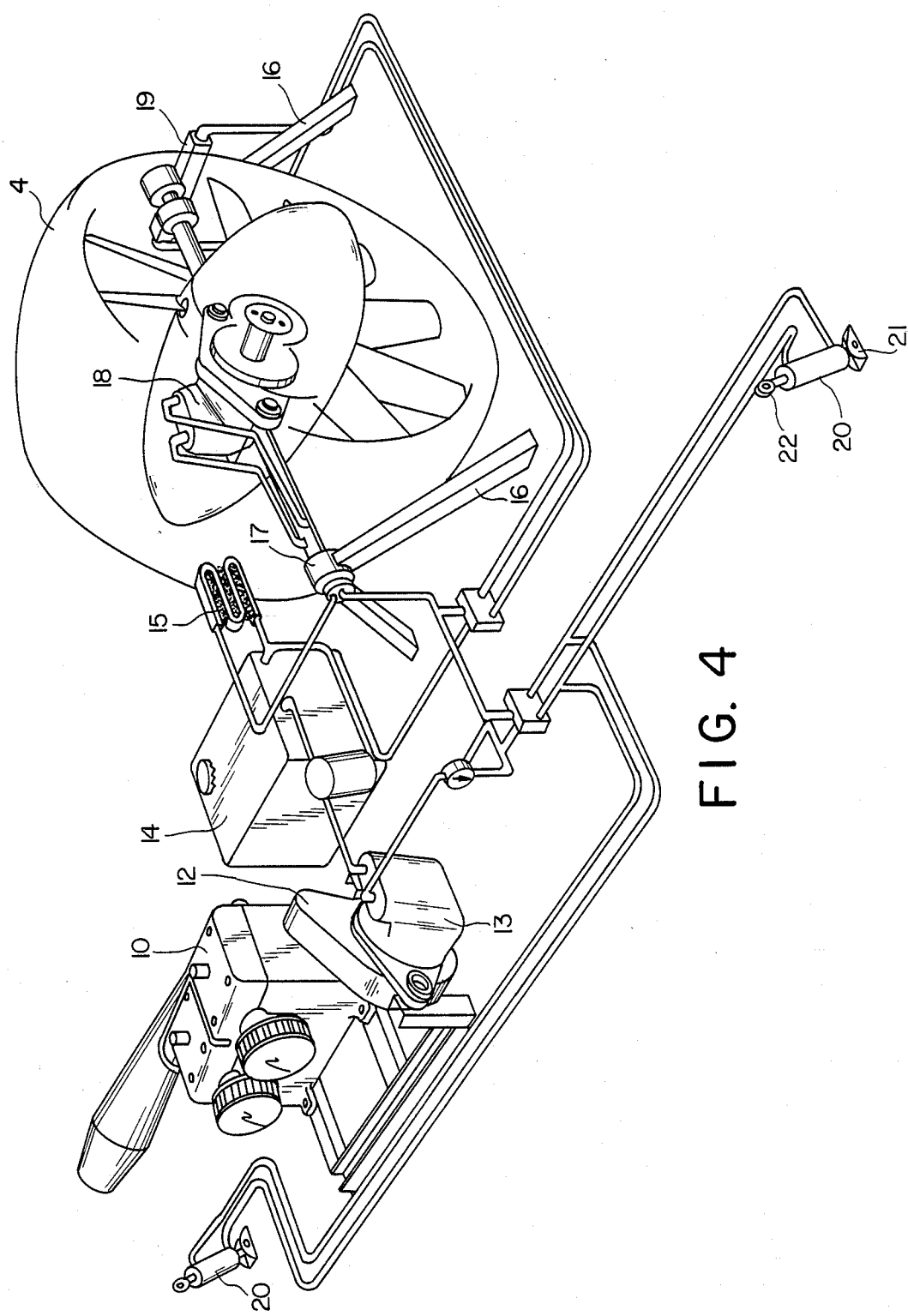
FIG. 4 shows a schematic perspective view of the motor and fan installation for the left air cushioning section.

In FIG. 4 is shown the driving installation for the air cushioning section 2. The driving installation for the air cushioning section 3 is a mirror image of the installation shown in FIG. 4. The installation as shown includes the motor 10 and a hydraulic drive system. The motor 10 can be a conventional internal combustion engine, and to its output shaft is connected a transmission 12 driving a hydraulic pump 13 which is connected to a hydraulic oil tank 14 and an oil cooler 15 by means of conduits. The fan 4 is carried on the air cushioning section by means of a stand 16, which on one side of the fan is provideed with a swivel-coupling 17 for the connection of hydraulic conduits to a hydraulic motor 18 driving the fan. At the other side of the fan the stand is provided with a hydraulic pivot means 19 for rotation of the fan around the essentially horizontal axis through the two stands. Even if not shown in the drawing the fan housing is also provided with hydraulic pivot means for rotation of the fan around an essentially vertical axis to obtain the steering properties of the craft. In this regard, for example, the stands 16 may be fixedly secured to a turntable (not shown) rotatably disposed with respect to a respective air cushioning section 2 or 3 and rotatable with respect thereto by virtue of having mounted thereto a rotary reversible hydraulic motor (not shown) controllable by a valve (not shown) interconnected into the hydraulic system shown in FIG. 4. The hydraulic system also includes a hydraulic piston/cylinder arrangement 20, of which the lower connection 21 is carried by the air cushioning section and of which the upper connection 22 is connected to the passenger cabin section (not shown in FIG. 4.)

By this hydraulic drive system is obtained a very simple and reliable drive system for the hovercraft. The regulation of the different parts of the hydraulic system as well as of the internal combustion engine is carried out in a conventional manner. As there is a hydraulic system with a separate engine on each of the two air cushioning sections 2, 3, there can, as an emergency device, be arranged a connection between the two hydraulic systems so that in case of an engine failure both fans can be driven by one engine through selective valve controlled interconnection of the two hydraulic systems, of course with such operation being at a much reduced capacity.

I claim:

1. A hovercraft comprising a first air cushion section, a second air cushion section and an intermediate section disposed between said first and second air cushion sections;

said intermediate section being vertically movable relative to each of said air cushion sections, said intermediate section including a passenger cabin;

each of said air cushion sections having a motor-driven fan means for lifting and propulsion of said hovercraft, each of said motor-driven fan means including a fan pivotable about a horizontal axis with respect to their respective air cushion sections;

first connection means for movably connecting said first air cushion section to said intermediate section, said first connection means comprising first piston/cylinder means for vertically moving said first air cushion section and said intermediate section relative to one another;

second connection means for movably connecting said second air cushion section to said intermediate section, said second connection means comprising second piston/cylinder means for vertically moving said second air cushion section and said intermediate section relative to one another.

2. The hovercraft according to claim 1, wherein each of said fans is a hydraulically driven fan; each of said motor-driven fan means further comprising an internal combustion engine drivingly connected to a hydraulic pump and hydraulic line means for drivingly delivering hydraulic fluid to said hydraulically driven fan.

3. The hovercraft according to claim 2, wherein said first and second piston/cylinder means comprise a hydraulic piston/cylinder device, each of said hydraulic piston/cylinder devices operatively connected to a respective hydraulic pump of a respective motor-driven fan means.

* * * * *

UNITED STATES PATENT AND TRADEMARK OFFICE
CERTIFICATE OF CORRECTION

PATENT NO. : 4,828,058
DATED : May 9, 1989
INVENTOR(S) : OLOF BJÖRN-AKE SKÖLD

It is certified that error appears in the above-identified patent and that said Letters Patent is hereby corrected as shown below:

On the cover page of the patent, after "Invenor:", the inventor's name should read --Olof Björn-Ake Sköld--;

On the cover page of the patent, under "Related U.S. Application Data", "May 14, 1985" should read --January 17, 1986--.

Signed and Sealed this

Seventh Day of November, 1989

Attest:

JEFFREY M. SAMUELS

Attesting Officer     Acting Commissioner of Patents and Trademarks